US011898525B2

(12) United States Patent
Geyer et al.

(10) Patent No.: US 11,898,525 B2
(45) Date of Patent: Feb. 13, 2024

(54) ROLLER TAPPET FOR A HIGH-PRESSURE FUEL PUMP

(71) Applicant: Schaeffler Technologies AG & Co. KG, Herzogenaurach (DE)

(72) Inventors: Norbert Geyer, Höchstadt (DE); Marco Junker, Obernzenn (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 106 days.

(21) Appl. No.: 17/625,353

(22) PCT Filed: Jun. 9, 2020

(86) PCT No.: PCT/DE2020/100482
§ 371 (c)(1),
(2) Date: Jan. 7, 2022

(87) PCT Pub. No.: WO2021/008648
PCT Pub. Date: Jan. 21, 2021

(65) Prior Publication Data

US 2022/0275778 A1 Sep. 1, 2022

(30) Foreign Application Priority Data

Jul. 12, 2019 (DE) .................... 10 2019 118 891.1

(51) Int. Cl.
*F02M 59/10* (2006.01)
*F01L 1/14* (2006.01)
(Continued)

(52) U.S. Cl.
CPC ............ *F02M 59/102* (2013.01); *F01L 1/14* (2013.01); *F04B 1/0408* (2013.01);
(Continued)

(58) Field of Classification Search
CPC ...... F02M 59/102; F01L 1/14; F01L 2305/00; F04B 1/0408; F04B 1/0426; F04B 9/042; F16J 1/10
(Continued)

(56) References Cited

U.S. PATENT DOCUMENTS 8,235,018 B2 8/2012 Dorn et al.
2015/0337940 A1* 11/2015 Berruet ................ F01M 9/106 74/569
2020/0095901 A1* 3/2020 Geyer ................ F02M 59/102

FOREIGN PATENT DOCUMENTS

DE 102008059004 A1 5/2010
DE 102009013132 A1 9/2010
(Continued)

*Primary Examiner* — Kenneth J Hansen
*Assistant Examiner* — Kelsey L Stanek

(57) ABSTRACT

The disclosure relates to a roller tappet for a high-pressure fuel pump. The roller tappet includes a housing that accommodates a cam contact roller next to a drive-side annular face of the housing. A bridge piece sits on an inner lateral surface of the housing, after the cam contact roller, as viewed from the drive-side annular face. An outer end face of the bridge piece has a rest for a pump piston. A separate adapter bolt protrudes from the rest beyond the output-side annular face of the housing; an end face of the adapter bolt, remote from the bridge piece, serves as a direct rest for the pump piston. An annular disc sits next to the output-side annular face of the housing, and the bore of said annular disc surrounds and retains the adapter bolt.

17 Claims, 3 Drawing Sheets

(51) Int. Cl.
*F04B 1/0408* (2020.01)
*F04B 1/0426* (2020.01)
*F04B 9/04* (2006.01)

(52) U.S. Cl.
CPC ............ *F04B 1/0426* (2013.01); *F04B 9/042* (2013.01); *F01L 2305/00* (2020.05)

(58) Field of Classification Search
USPC ........................................................ 123/90.48
See application file for complete search history.

(56) References Cited

FOREIGN PATENT DOCUMENTS

| | | | | | |
|---|---|---|---|---|---|
| DE | 102014208607 | A1 | * | 11/2015 | ................ F01L 1/14 |
| DE | 102014208607 | A1 | | 11/2015 | |
| DE | 102017107099 | B3 | | 6/2018 | |
| DE | 102017107100 | B3 | | 6/2018 | |
| DE | 102017109761 | A1 | * | 11/2018 | ................ F01L 1/14 |
| DE | 102017109761 | A1 | | 11/2018 | |
| DE | 102017125699 | B3 | * | 11/2018 | |
| DE | 102019117910 | A1 | * | 1/2021 | |
| EP | 2947285 | A1 | | 11/2015 | |

* cited by examiner

ROLLER TAPPET FOR A HIGH-PRESSURE FUEL PUMP

CROSS-REFERENCE TO RELATED APPLICATIONS

This application is the U.S. National Phase of PCT Application No. PCT/DE2020/100482 filed on Jun. 9, 2020, which claims priority to DE 10 2019 118 891.1 filed on Jul. 12, 2019, the entire disclosures of which are incorporated by reference herein.

TECHNICAL FIELD

This disclosure relates to a roller tappet.

BACKGROUND

A roller tappet, which is particularly suitable for comparatively large installation distances between the pump cam or eccentric and the pump piston, is shown in FIG. 1 of DE 10 2017 109 761 A1. The housing of the roller tappet consists of two aligned guide sections made of sheet steel joined together, wherein a central and solidly made stroke transmission dome resting on the inner wall.

A roller tappet produced by extrusion molding is shown in FIG. 2 of DE 10 2008 059 004 A1. It can be seen that the bridge piece thereof is integrally connected to the housing. The roller tappet has a height-to-diameter ratio that is approximately in the range of 1:1 or close thereto.

A roller tappet made of sheet steel with a separate insert plate as a bridge piece is disclosed in FIG. 1 of DE 10 2009 013 132 A1. It also has approximately the aforementioned height-diameter ratio.

SUMMARY

The object is to create a roller tappet that can be produced inexpensively, that is suitable for large installation distances, and that can be easily adapted to different installation lengths.

According to the disclosure, this object is achieved in that a separate adapter bolt protrudes from the rest of the bridge piece over the output-side annular face of the housing. An end face of the adapter bolt remote from the bridge piece serves as a direct rest for the pump piston. An annular disc sits next to the output-side annular face of the housing, the bore of said annular disc surrounding and retaining the adapter bolt.

Such a roller tappet, which is also provided for a valve drive of an internal combustion engine or an impeller/compressor or the like, can be manufactured comparatively inexpensively and is easy to build. Particularly noteworthy is that the roller tappet is ideally suited for use in injection pump drives with large installation distances between the pump cams and pump pistons and that by and large it is possible to fall back on fully constructed and mass-produced housings with a bridge piece and cam contact roller.

To adapt to different installation lengths, it is only necessary to fall back on adapter bolts that are kept available in different lengths. It is also possible to compensate for length play.

The adapter bolt can simply be separated from a rod section or it can be present as a rotating part. If necessary, it can also have a polygonal geometry or be multi-stepped.

For the simple fixation of the adapter bolt on the roller tappet, at least for handling/transporting same up to the installation on the internal combustion engine/injection pump, an annular disc is also proposed which, with the bore thereof, encompasses the adapter bolt. The annular disc can be a simple plastic injection ring. However, a metal construction is also conceivable, for example made of sheet steel.

As suggested, the annular disc is stationary, but can be detachable, at the ring end of the housing on the output side. In an example embodiment, an axially lengthening annular collar projects away from the bore of the annular disc on one or both sides.

According to a further development of the disclosure, the latter-mentioned annular collar surrounds the adapter bolt via a friction fit/press fit. As an alternative thereto, it is proposed for the adapter bolt to be stepped and to let it strike an inner side of the annular disc via an annular step between the step sections thereof. Another variant is a solution in which the annular collar is slotted and thus provided with at least one spring tongue which engages in a complementary latching recess on the outer lateral surface of the adapter bolt for the purpose of retaining via an inner-wall claw or the like.

One example embodiment relates to a simple fastening of the annular disc, which, if necessary, can also only have the shape of a plate passing through the housing. Accordingly, the annular disc has an axial ring radially on the outside, which can protrude over the annular disc on one or both sides. One of these sections should be connected to the housing, for example via a latching or snap connection.

In a further development thereof, it is proposed that the housing has, for example, windows into which are snapped into place lugs or the like, which protrude from the corresponding section of the annular disc. Alternatively, an annular groove or a stepped shoulder on the inner lateral surface of the housing is also conceivable and provided as a counter-contour for retaining projections extending from the annular disc.

In the case of a one-piece design of the housing of the roller tappet with the bridge piece, it is advisable to extrude the housing. The multi-part variant enables a simple sheet metal representation of the housing.

The cam contact roller can run on a bolt. Alternatively, a bearing shell is also provided which lies on the bridge piece or a bearing in a respective cavity of the bridge piece.

DETAILED DESCRIPTION

Figure 1:
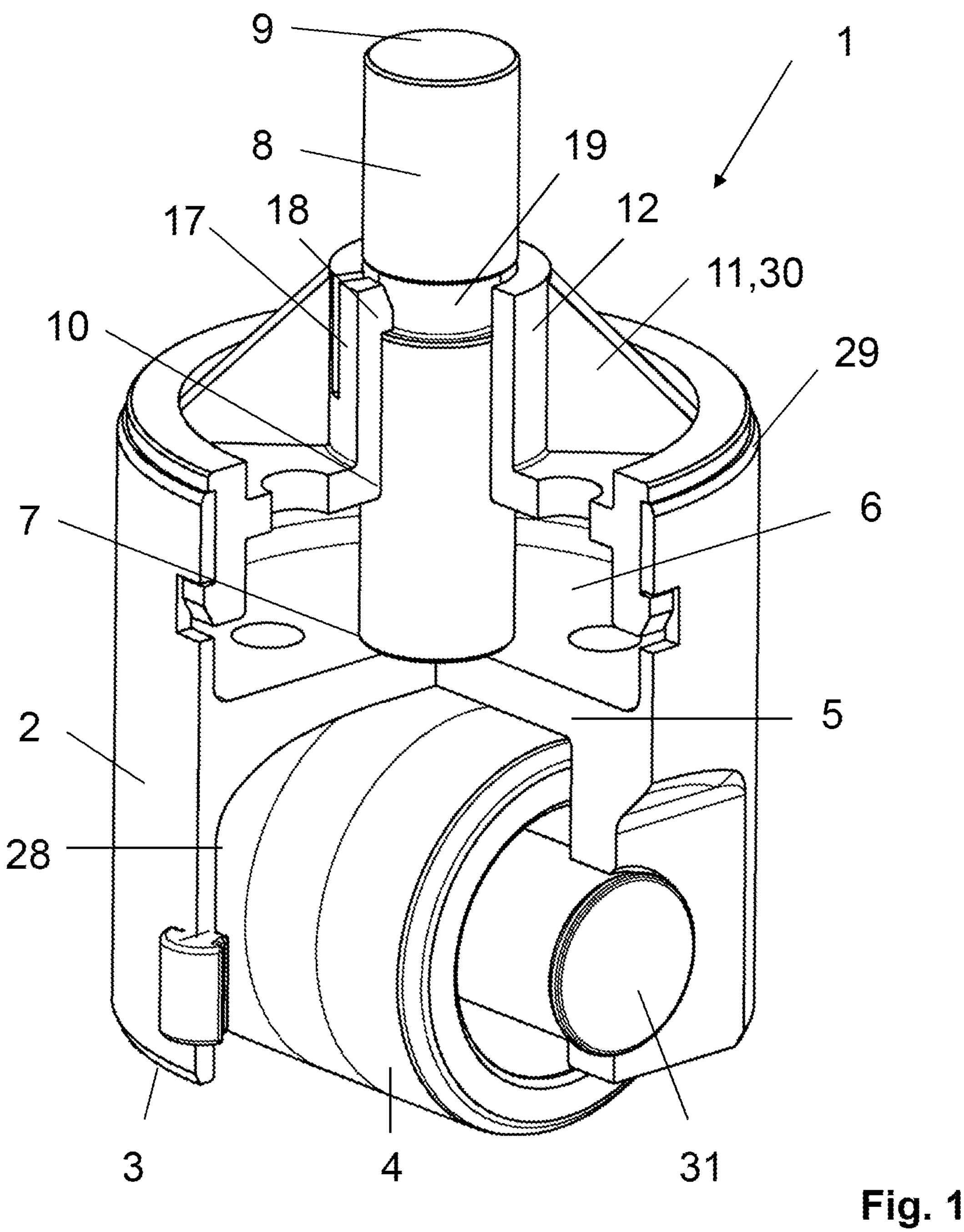
FIG. 1 shows a broken representation of a roller tappet, the annular disc of which fixes the adapter piece by means of spring tongues.

The figures disclose a roller tappet 1 for a high-pressure fuel pump. According to FIGS. 1, 3, the roller tappet 1 has a housing 2 formed by extrusion molding and, according to FIG. 2, from sheet steel.

For the most part within a drive-side annular face 3 of the housing 2, shown here "below," a cam contact roller 4 is accommodated which runs on a bolt 31 seated at the end in the housing 2.

Figure 2:
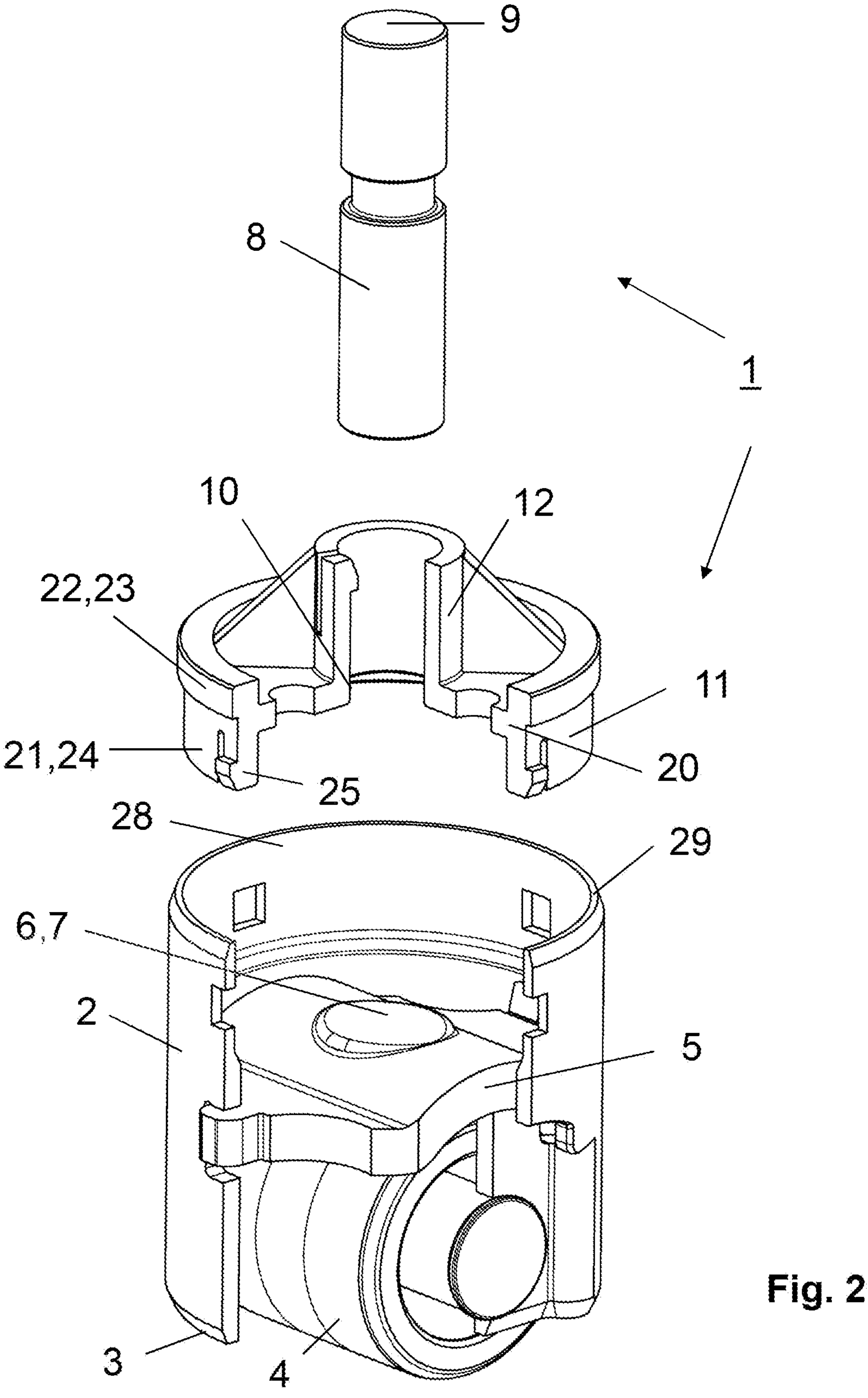
FIG. 2 shows a roller tappet as mentioned above, but in an exploded view and with a separate bridge piece.
Figure 3:
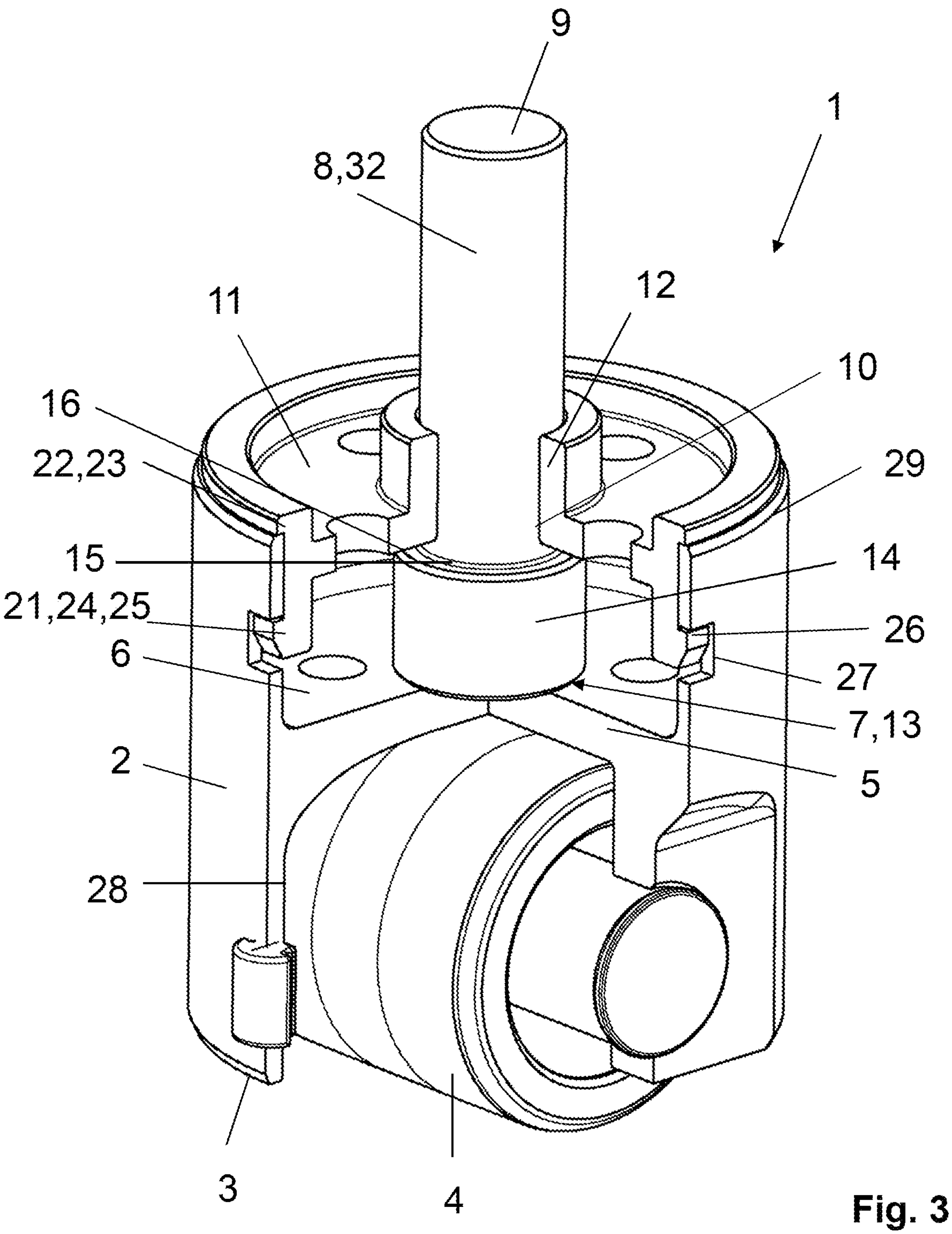
FIG. 3 shows a roller tappet as in FIG. 1, but having an alternative retainer for the adapter piece thereof.

According to FIGS. 1, 3, a bridge piece 5 is connected in one piece to an inner lateral surface 28 of the housing 2 after the cam contact roller 4 as viewed from the drive-side in the direction of an output-side annular face 3, 29. According to the embodiment of FIG. 2, the bridge piece 5 is in the form of a sheet metal plate joined separately to the housing 2. An indirect rest 7 for a pump piston, which is raised according to FIG. 2, is intrinsic on the outer face 6 of the bridge piece 5. The rest 7 can optionally also be provided with an applied hard material layer.

As shown, an outer lateral surface 20 of the annular disc 11 merges into or is integrally formed with an axial ring 21 so that a T-like profile is present in cross section in this area. An axially outer section 22 of the axial ring 21 lies on the output-side annular face 29 of the housing 2 via a radial collar 23 and fixes the annular disc 11 in the direction of the housing. An axially inner section 24 of the axial ring 21 is coupled to the housing 2 via a latching connection 25. More precisely, several circumferentially distributed teeth 26 extend radially outward from the axially inner section 24, which teeth are snapped into complementary pockets 27 (windows) of the housing 2. In this way, the annular disc 11 is detachably retained or secured by the housing 2.

It is evident that a separate adapter bolt 8 protrudes from the rest 7 of the bridge piece 5 over the output-side annular face 29 of the housing 2, the end face 9 of which, shown here “above” and facing away from the bridge piece 5, directly rests on the pump piston.

To retain the adapter bolt 8 at least until it is installed in the high-pressure pump drive in the housing 2, an annular disc 11 made of plastic or sheet metal and encompassing the adapter bolt 8 with the bore 10 thereof sits at the output-side annular face 29 of the housing 2. The bore area of the annular disc 11 merges into or is integrally formed with an annular collar 12 that projects away from the housing 2. The annular collar 12 can retain the adapter bolt 8 solely by means of a press fit.

According to the solution according to FIGS. 1, 2, however, a surrounding segment 17 of the annular collar 12 has a spring tongue with an inner-wall claw 18 and the adapter bolt 8 has a locking recess 19 complementary to the claw 18, which is provided as an annular groove. It is clear at this point that more than one spring tongue 12 is also possible. The claw 18 engages in the locking recess 19 and fixes the adapter bolt 8 solely by means of a form fit or in addition to the aforementioned press fit.

As an alternative to the latter, the adapter bolt 8 has a ring extension 14 located at the end face 13 thereof on the bridge piece side. The adapter bolt 8 strikes an inner side 16 of the annular disc 11 via a ring step 15 of the ring extension 14 to form an annular region 32 of reduced diameter, which is enclosed by the annular collar 12 (see FIG. 3).

LIST OF REFERENCE SYMBOLS

1 Roller tappet
2 Housing
3 Annular face on the drive side
4 Cam contact roller
5 Bridge piece
6 Outer face
7 Rest
8 Adapter bolt
9 End face
10 Bore
11 Annular disc
12 Annular collar
13 End face
14 Ring extension
15 Ring step
16 Inner side
17 Surrounding segment, spring tongue
18 Claw
19 Locking recess
20 Outer lateral surface
21 Axial ring
22 Section
23 Radial collar
24 Section
25 Latching connection
26 Tooth
27 Pocket
28 Inner lateral surface
29 Annular face on the output side
30 Stiffening strut
31 Bolt
32 Annular region

The invention claimed is:

1. A roller tappet for a high-pressure fuel pump, the roller tappet comprising:
a housing having:
a cam contact roller arranged on a drive-side of the housing,
a bridge piece arranged: i) on an inner lateral surface of the housing, and ii) between the cam contact roller and an output-side annular face of the housing, the bridge piece having a rest configured for actuating a pump piston,
a separate annular disc arranged on an output-side of the housing,
a separate adapter bolt extending from the rest beyond the output-side annular face of the housing, and an end face of the adapter bolt, remote from the bridge piece, is configured as a direct rest for the pump piston, and
a bore of the annular disc surrounds and retains the adapter bolt, the bore integrally formed with an annular collar and the annular collar protruding axially from the annular disc, and
at least one surrounding segment of the annular collar is configured as a spring tongue formed with an inner-wall claw, and
the adapter bolt has a locking recess configured to receive a respective inner-wall claw, and the adapter bolt is axially retained by engagement of the claw in the locking recess.

2. The roller tappet of claim 1, wherein the adapter bolt is retained with a press fit.

3. The roller tappet of claim 1, wherein the adapter bolt includes a ring extension having a ring step configured to engage an inner side of the annular disc.

4. The roller tappet of claim 1, wherein:
an outer surface of the annular disc is integrally formed with an axial ring,
an axially outer section of the axial ring engages the output-side annular face of the housing via a radial collar, and
an axially inner section of the axial ring is detachably secured to the housing via a snap-in connection.

5. The roller tappet of claim 4, wherein at least one tooth protrudes radially outward from the axially inner section of the axial ring of the annular disc, and the at least one tooth is received by a respective complementary pocket so that the axial ring is detachably secured to the housing.

6. The roller tappet of claim 1, wherein the annular disc is fabricated from plastic.

7. The roller tappet of claim 1, wherein the bridge piece is formed integrally with the housing.

8. The roller tappet of claim 1, wherein the bridge piece is a separate plate joined to the housing.

9. The roller tappet of claim 1, wherein the locking recess is an annular groove formed on the adapter bolt.

10. The roller tappet of claim 1, wherein the annular disc is fabricated from sheet metal via stamping and bending.

11. A roller tappet for a high-pressure fuel pump or a valve drive of an internal combustion engine, the roller tappet comprising:

- a housing having:
  - a cam contact roller arranged on a drive-side of the housing, and
  - a plurality of pockets,
- an annular disc formed separately from the housing, the annular disc having a plurality of circumferentially distributed teeth, each one of the plurality of circumferentially distributed teeth configured to lock into a corresponding one of the plurality of pockets so that the annular disc is detachably secured to an output-side of the housing,
- an adapter bolt formed separately from the housing, the adapter bolt extending axially through a bore of the annular disc and axially beyond the output-side of the housing, and
- a bridge piece disposed within the housing between the cam contact roller and the annular disc, the bridge piece having a rest configured to receive the adapter bolt, and
- a bore of the annular disc surrounds and retains the adapter bolt.

12. The roller tappet of claim 11, wherein the bore retains the adapter bolt via a press-fit.

13. The roller tappet of claim 11, wherein the annular disc further comprises an axially outer section, the axially outer section configured to engage an output-side annular face of the housing.

14. The roller tappet of claim 13, wherein the axially outer section of the annular disc includes a radial collar, the radial collar configured to engage the output-side annular face of the housing.

15. A roller tappet for a high-pressure fuel pump or a valve drive of an internal combustion engine, the roller tappet comprising:

- a housing having a cam contact roller arranged on a drive-side of the housing,
- an annular disc formed separately from the housing and detachably secured to an output-side of the housing,
- an adapter bolt formed separately from the housing, the adapter bolt extending axially through a bore of the annular disc and axially beyond the output-side of the housing, and
- a bridge piece disposed within the housing between the cam contact roller and the annular disc, the bridge piece having a rest configured to receive the adapter bolt, and
- a bore of the annular disc: i) surrounds and retains the adapter bolt, and ii) extends axially beyond the output-side of the housing.

16. The roller tappet of claim 15, wherein the bore of the annular disc is formed with at least one claw configured to engage with and retain the adapter bolt.

17. The roller tappet of claim 16, wherein the at least one claw engages an annular groove arranged on the adapter bolt.

* * * * *